E. H. BAXTER.
TRANSMISSION LOCK.
APPLICATION FILED APR. 30, 1920.

1,428,316.

Patented Sept. 5, 1922.
2 SHEETS—SHEET 1.

Ernest H. Baxter.
INVENTOR.

BY
ATTORNEYS.

E. H. BAXTER.
TRANSMISSION LOCK.
APPLICATION FILED APR. 30, 1920.

1,428,316.

Patented Sept. 5, 1922.
2 SHEETS—SHEET 2.

Ernest H. Baxter.
INVENTOR.

BY

ATTORNEYS.

Patented Sept. 5, 1922.

1,428,316

UNITED STATES PATENT OFFICE.

ERNEST H. BAXTER, OF CHICAGO, ILLINOIS.

TRANSMISSION LOCK.

Application filed April 30, 1920. Serial No. 377,883.

*To all whom it may concern:*

Be it known that I, ERNEST H. BAXTER, a citizen of the United States, residing at Chicago, in the county of Cook and State of Illinois, have invented new and useful Improvements in Transmission Locks, of which the following is a specification.

This invention relates to devices for preventing the theft or unauthorized use of automobiles and other motor vehicles, and the device has been designed more particularly for application to the well known Ford car, the locking mechanism consisting of a means for locking the clutch actuating element in neutral position so as to disable the gearing for the low and high speeds, without however preventing the mechanism from being operated to obtain the reverse drive.

The invention has for its object to provide a simple and efficient locking device of the kind stated, and also to provide a lock for the cover of the enclosure in which said device is housed.

A further object of the invention is to provide an audible alarm device which becomes automatically active in the event of an attempt being made to run the car in reverse speed when the clutch actuating element is locked, or to tow the same in forward or backward direction.

The objects stated are attained by means of a novel combination and arrangement of parts to be hereinafter described and claimed, and in order that the same may be better understood, reference is had to the accompanying drawings forming a part of this specification.

Figure 1:
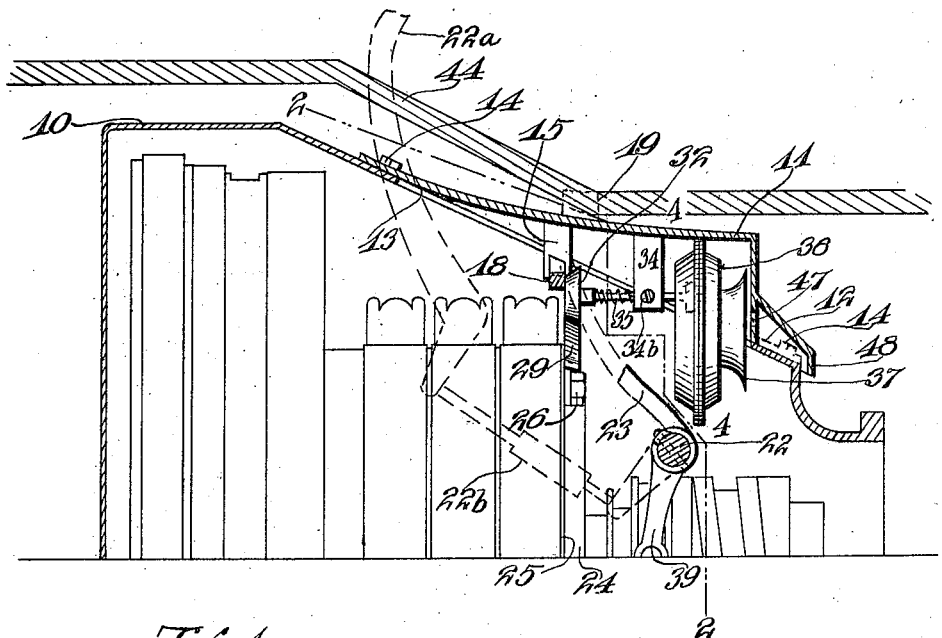
Figure 2:
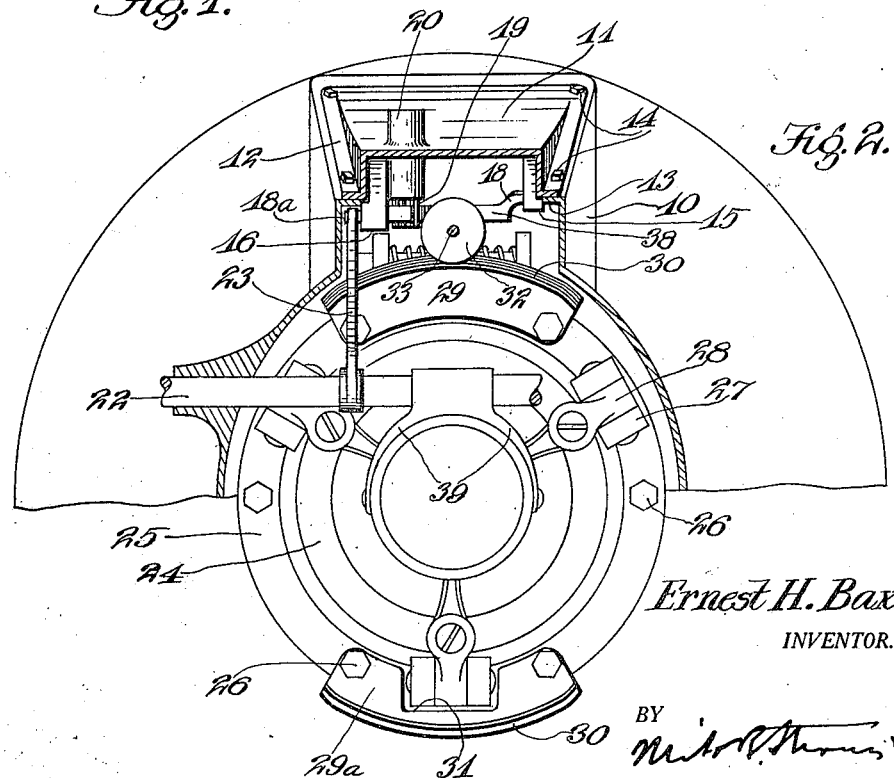
Figure 3:
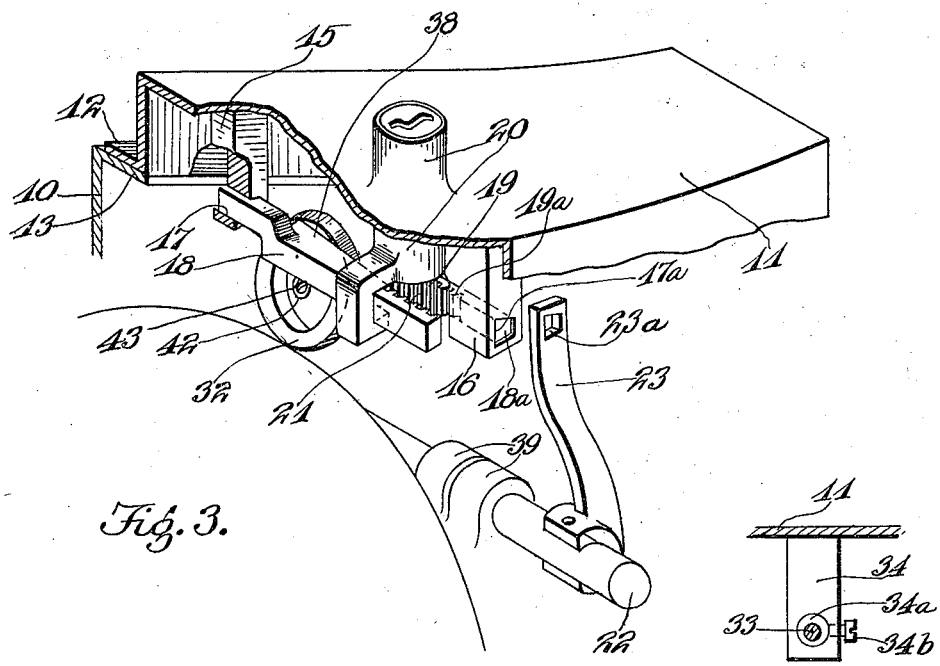
Figure 6:
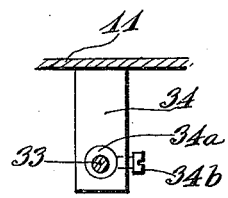
Figure 4:
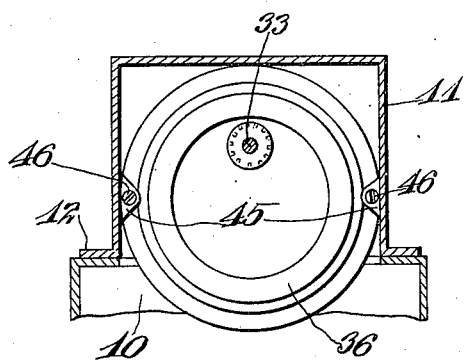
Figure 5:
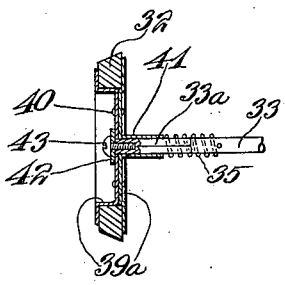

In the drawings, Figure 1 is an interior view of the upper portion of a Ford transmission housing, showing in elevation and sectionally parts of the invention; Fig. 2 is a cross section on the line 2—2 of Fig. 1; Fig. 3 is a perspective view of the locking parts in another position, surrounding parts being shown fragmentally; Fig. 4 is a cross-section of a door for the housing cover, showing the mode of securing the audible alarm therein; Fig. 5 is a cross-section of an element which takes part in the operation of the said alarm; and Fig. 6 is an elevation of a detail.

Referring specifically to the drawings, 10 denotes the cover enclosing the upper half of the transmission mechanism of the Ford car. As the novel locking and alarm device does not require any change to be made in the structure and operation of the transmission mechanism, it will be unnecessary to describe or illustrate the latter in detail, it being sufficient to refer to the Patent No. 1,078,042 of Henry Ford, dated November 11, 1913. A change is made, however, in the cover 10 of the transmission housing, in the form of a new door 11 therefor, which provides a housing and support for certain parts of the locking and alarm mechanism.

The top opening of the cover 10 has an inward marginal flange 12 on which rests the base flange 13 of the door 11, the flange 13 being apertured to take the set of securing bolts 14 used with the standard door. The door 11 is made high to provide internal space for certain parts, among these being two bosses 15 and 16 projecting inwardly from the side walls of the door. The bosses drop to a short distance below the cover flange 12, being transversely apertured at 17 and 17$^a$ near their lower ends. The bosses form slide bearings for two bars 18 and 18$^a$ positioned transversely of the housing and in parallel and spaced relation. The bars overlap at their inner ends, and their contiguous faces are formed with rack teeth 19$^a$. Between the inner ends of the bars is the vertical barrel 19 of a key-operated lock, said barrel being rotatably housed in a sleeve 20 integral with the door 11, and having pinion teeth 21 in mesh with the rack teeth of the bars 18 and 18$^a$. Thus, when the lock 19 is turned in one direction the bars 18 and 18$^a$ move outwardly—or away from each other—and their outer ends slide underneath the sections of the cover flange 12, as shown in Fig. 2. The bars thus act as locking bolts, and will prevent the door 11 from being removed, even after the bolts 14 have been taken out.

The bar 18$^a$ is also employed to prevent the high speed clutch and the low speed gears of the transmission from becoming engaged at certain times. Only the clutch actuating shaft 22 and its fork 39 have been fully illustrated, such other actuating parts as the "low speed" foot pedal 22$^a$ and its connections 22$^b$ with the shaft 22 being indicated by dotted lines in Fig. 1, and fully shown and described in the patent of record. In the new embodiment, a radial arm 23 is made fast with its lower end around the shaft 22, the arm rising to a height where it would cross the path of the bar 18$^a$ if swung in a forward direction—considering its position to correspond with that of the vehicle—and having a transverse aperture 23ª near its upper end. The sweep of the arm 23 is similar to that of the "low speed" foot pedal, so that it may be considered that when the pedal is pressed forward into "neutral," the arm 23 advances likewise to a point at which the aperture 23ª is directly in the path of the slide bar 18ª. At this time, should the bar be moved outwardly as described in connection with the locking of the cover door 11, it would pass into the aperture 23ª of the arm 23, as indicated in Fig. 2, and would thus prevent the arm from moving in forward or rearward direction. The foot pedal 22ª, whose movement is similar to that of the arm 23, would thus be locked in "neutral," and disabled for actuating the low speed gears; and it would also be impossible to apply the clutch to secure high speed for the reason that the actuating shaft 22 could not be rocked back to original position, due to the fixed position of the arm 23.

It will be apparent from the foregoing that three locking actions can be attained by giving the key-operated lock 19 a turn, namely, the locking of the cover door 11 to prevent access to the interior of the transmission housing, of the "low speed" gear, and of the "high speed" element. As it would still be possible to operate the car in "reverse," or to tow it, a method of detecting the unauthorized use of the car in these ways is now provided in the form of an audible alarm device, which is adapted to sound when a car "locked" in the manner described is put in motion either by the motor through the reverse gearing, or by being towed, in which event the rear wheels furnish the motive power through the propeller shaft.

Referring to Figs. 1 and 2, it will be noted that the rear end of the drum assembly 24 of the Ford transmission carries a circular plate 25, which is secured to it by six bolts 26. Between alternate bolts, the plate has pivot bearings 27 for the clutch fingers 28. Use is made of the plate 25 and opposite pairs of the bolts 26 for the attachment of two segmental plates 29 and 29ª, which are formed with a beveled periphery 30. The plates 29 and 29ª are secured to the plate 25 by the corresponding bolts 26, the plate 29ª being slotted at 31 to clear one of the pivot bearings 27. As the rear end of the drum assembly rotates when the car moves in any speed, or when it is towed, it follows that the segmental plates 29 and 29ª will be carried around accordingly. A short distance above the circular plate 25 is a beveled disk wheel 32, which is slidably mounted on a spindle 33 placed longitudinally of the transmission in a hanger 34 depending from the door 11 of the housing cover. The wheel is slidable on a squared portion 33ª of the spindle 33, and is urged in a forward direction by a coil spring 35 mounted on the spindle to a point where its periphery would make frictional contact with the beveled periphery 30 of either of the segmental plates 29 and 29ª. The rear end of the spindle 33 passes into the casing 36 of an automobile horn 37 of the vibrating diaphragm type, so as to operate the same when the spindle is in motion. It will be evident now that the above described arrangement will, in the position shown, be actuated by the rotation of the drum plate 25, so as to voice the alarm through the agency of the horn 37. As the plates 29 and 29ª, through their peripheries 30, successively engage the disk wheel 32 during this action, said peripheries are designed with a slight drop at each end, as shown in Figure 3, to render the frictional engagement gradual.

In order to discontinue the alarm when it is no longer necessary for the car to be "locked," the slide bar 18 is rearwardly enlarged to form an oblique cam 38, this being more clearly shown in Fig. 3. When the lock 19 is turned to gather the slide bars 18 and 18ª, the cam 38 moves in front of the disk wheel 32, crowding the same rearwardly out of the path of the segmental plates 29 and 29ª below.

It will thus be evident that a turn of the key-operated lock 19 will prevent the car from being run in low or high speed, will render the locking element inaccessible under ordinary conditions, and will cause a continuous alarm to be sounded if the car should be driven in rearward direction, or towed. The fact that the car could still be operated in the ways last described would not detract from the utility of the invention, as the running of the engine while the car moves in rearward direction would cause overheating of the cylinders, due to the relatively high speed required of the engine. Also, the movement of the car in "reverse" or when towed would necessarily be slow, rendering the noise of the alarm more noticeable, and reducing very much the chances of escape.

The specific construction of the disk wheel 32 is sectionally illustrated in Fig. 5. The wheel is made up of a ring of fibre or other suitable material, clamped between two circular disks 39ª, which are riveted together at 40. One of these disks has a tubular hub 41 of square cross-section, which is slidable on the squared portion 33ª of the spindle 33. The forward motion of the wheel is limited by one or more washers 42, according to the amount of adjustment desired, secured by a screw 43 fitted in the end of the spindle. In order that the position of the disk wheel 32 may be vertically or laterally adjustable to secure proper contact with the segmental plates 29 and 29ª, the spindle 33 is eccentrically journaled in a sleeve bearing 34ª fitted in the hanger 34, as shown in Fig. 6, the sleeve being held adjusted by a set screw 34ᵇ.

The external section of the key-operated lock 19 may rise through an opening in the floor boards 44, as indicated in Fig. 1, for handy access by the driver.

Although the horn casing 36 may be supported in any suitable manner, the method of Fig. 4 is preferred. The walls of the door 11 are made with inwardly projecting ears 45, against which the casing is placed, screws 46 being used to secure the latter in place. While the horn should be capable of emitting a sufficient alarm, it may be considered advisable to use a bell or gong instead. Bells or gongs adapted to the present situation are of common design, and no invention would be involved in the change. In order that the alarm may be heard clearly, the back of the new door is made with one or more openings 47, these being guarded by a barrier 48 to prevent access to the interior of the housing with a tool for the purpose of disabling the alarm or locking mechanism.

I claim:

The combination with a clutch controlling shaft; of a radial arm fast on said shaft and having a transverse keeper aperture, a bolt slidably positioned transversely of the arm to enter the keeper aperture when the latter is in alinement with the bolt, and lock controlled means for actuating the bolt.

In testimony whereof I affix my signature.

ERNEST H. BAXTER.